Jan. 30, 1940. J. KARMAZIN Re. 21,339

HEAT EXCHANGE APPARATUS

Original Filed April 13, 1935 2 Sheets-Sheet 1

INVENTOR.
JOHN KARMAZIN
BY
Spencer Hardman & Fehr.
ATTORNEYS

Jan. 30, 1940. J. KARMAZIN Re. 21,339

HEAT EXCHANGE APPARATUS

Original Filed April 13, 1935 2 Sheets-Sheet 2

INVENTOR.
JOHN KARMAZIN

BY
Spencer Hardman & Fehr
ATTORNEYS

Reissued Jan. 30, 1940

Re. 21,339

UNITED STATES PATENT OFFICE 21,339

HEAT EXCHANGE APPARATUS

John Karmazin, Grosse Ile, Mich., assignor, by mesne assignments, of one-half to Rose M. Karmazin, Grosse Ile, Mich.

Original No. 2,045,657, dated June 30, 1936, Serial No. 16,207, April 13, 1935. Application for reissue December 7, 1937, Serial No. 178,627

6 Claims. (Cl. 257—139)

This invention relates to refrigerating apparatus and more particularly to a novel heat exchange structure by which greater efficiencies in heat transfer between two fluids may be accomplished.

It is an object of this invention to provide a heat exchange device for refrigerating apparatus and for other uses which is formed from a plurality of sheet metal fins having integral tube forming portions thereon by which the fins are nested together to provide a heat exchange structure of the fin and tube type.

More particularly, it is an object of this invention to provide such a structure with means for increasing efficiency in heat transfer, and to provide deflecting means within the tubes of the heat exchange device tending to direct the course of the fluid within the tube toward the surface of the tube exposed to incoming air or other fluid flowing around the tubes.

Further objects and advantages of the present invention will be apparent from the following description, reference being had to the accompanying drawings wherein a preferred form of the present invention is clearly shown.

Figure 1:
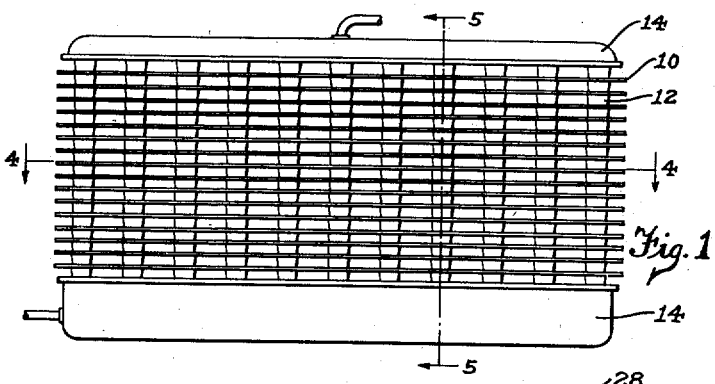
Fig. 1 is a front view of a heat exchange structure embodying the present invention.
Figure 2:
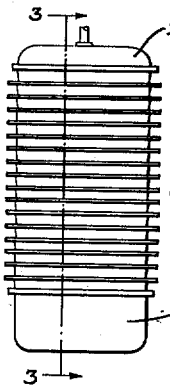
Fig. 2 is an end view of a heat exchange structure embodying the present invention.

Referring now to Fig. 1, there is shown a heat exchange structure comprising a plurality of fins 10 having tapered tube forming portions 12 integrally formed therein by which a plurality of fins may be nested together to provide the core of the heat exchange device. The tubes which are formed by the portions 12 may be connected together in any desired circuit relation by headers 14 at the top and bottom of the core. The headers 14 comprise plates 16 and 18 which are formed similarly to the fins 10 and drawn trough-like members 20 and 22 which are secured to the plates 16 and 18 respectively by overlapping seams 24—26 around their peripheries. Suitable inlet and outlet connections 28 are provided in the headers 14.

Figure 3:
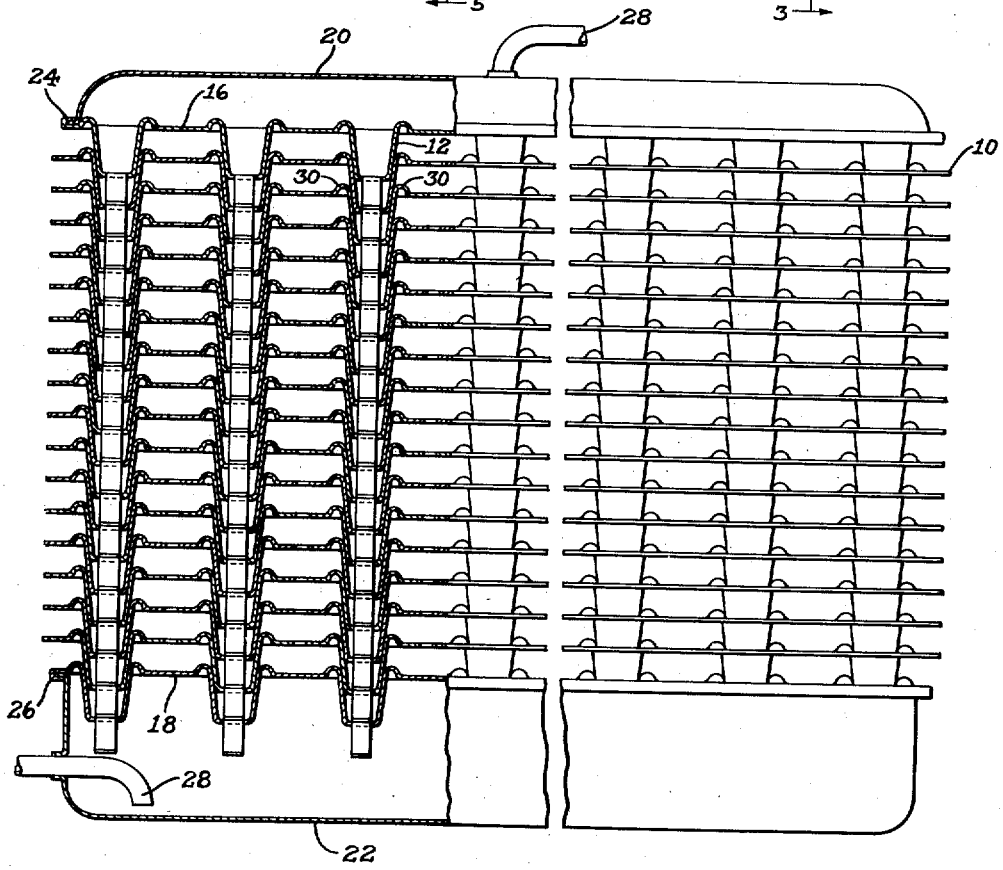
Fig. 3 is a view corresponding to Fig. 1 on a larger scale showing a portion of the device in cross section.
Figure 4:
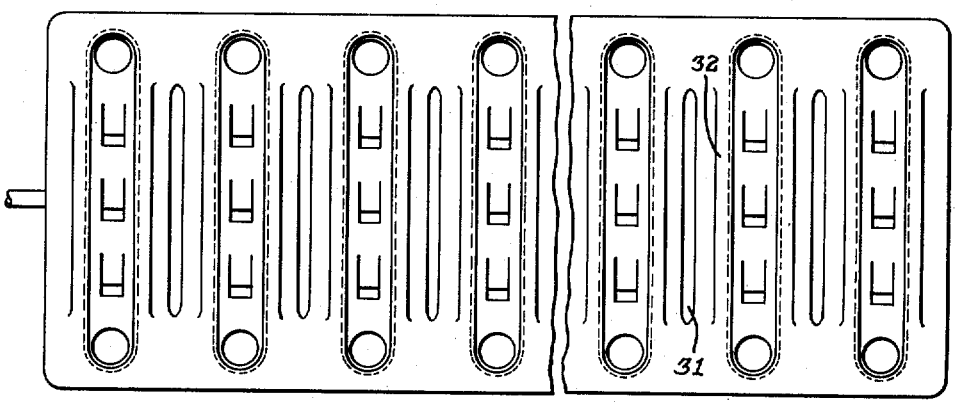
Fig. 4 is a top view of one of the fins from which the structure of Fig. 1 is formed.
Figure 5:
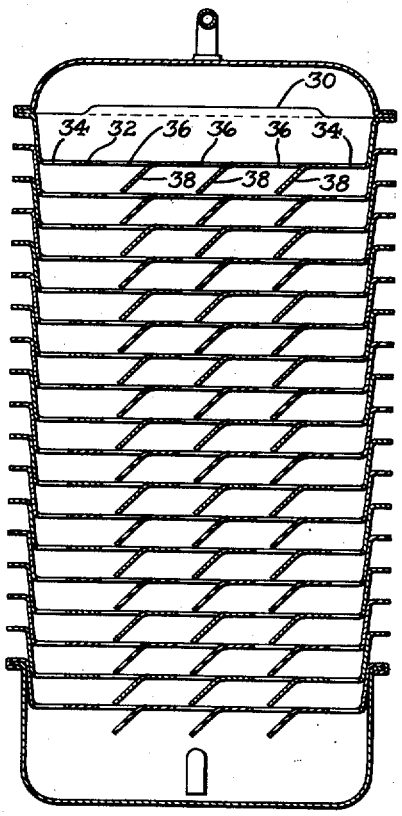
Fig. 5 is a cross section on line 5—5 of Fig. 1.

The structure of the fins is clearly illustrated in Figs. 3 to 5. The fins are formed by a stamping operation to provide a plurality of tapered tube forming portions 12 which are elongated transversely of the heat exchange device. If desired, a stiffening ridge 30 may be formed along the side wall of each tube portion 12 in order to give added rigidity to the fin structure. The stiffening ridge 30 aids in preventing the distortion of the fin structures both during the telescoping operation and during the welding operation. A slit 31 between each tube prevents stretching of the fin metal to the point of rupture. After the fins are formed to provide the tube forming portions 12 with a closed bottom 32, the bottom is perforated and formed to provide apertures 34 in either end of the portion 12 and intermediate apertures 36. The material of the apertures 36 is bent downwardly to provide a deflector 38 at one side of each of the apertures 36. It will be noted that the disposition of the deflectors 38 is such that all face in the same direction and tend to deflect fluid flowing through the tube diagonally thereof. The entire structure thus described is assembled by nesting the fins together and sealing the structure in any well known manner such as by soldering or welding.

In operation, it being assumed that the apparatus is to be used for a refrigerant condenser, compressed gaseous refrigerant may be conducted to the upper header 14. The refrigerant flowing downwardly through the tubes of the core passes through the apertures 34 and 36. In passing through the apertures 36, the deflectors 38 direct the down-flowing refrigerant toward the left hand side of the device as viewed in Fig. 5. The direction of the flow of cooling medium, for example, air, through the space between the fins and around the tubes is preferably from left to right in Fig. 5 so that the refrigerant being condensed is deflected constantly toward the end of the tube which faces the stream of incoming air. Thus, a heat exchange structure is provided by which the fluid flowing in the tubes is constantly urged toward the end of the tube which lies adjacent the incoming fluid which flows around the tube. Inasmuch as there are ordinarily a large number of such deflectors within a single tube, it will be seen that substantially all of the fluid which passes through the tube is brought in contact at one time or another with the wall of the tube which is in contact with the incoming medium flowing outside of the tube. In this way, the efficiency of heat transfer is increased. While the invention has been disclosed in connection with a particular application thereof, namely: to the art of refrigeration, it will be understood that the invention may be incorporated in heat exchangers designed for other purposes.

While the form of embodiment of the present invention as herein disclosed constitutes a preferred form, it is to be understood that other forms might be adopted, all coming within the scope of the claims which follow.

What is claimed is as follows:

1. A heat exchanger comprising a plurality of nested fin elements each having integrally formed therewith a plurality of tapered tube-forming portions, said portions being elongated in the direction of fluid flow outside the tubes, each tube-forming portion having an apertured bottom, and means associated with a plurality of the apertures in the bottom of each tube-forming portion for deflecting fluid flowing through the tubes in the direction of the incoming fluid passing around said tubes.

2. A heat exchanger comprising a plurality of nested fin elements each having integrally formed therewith a plurality of tapered tube-forming portions, said portions being elongated in the direction of fluid flow outside the tubes, each tube-forming portion having an apertured bottom, and means associated with a plurality of the apertures in the bottom of each tube-forming portion and integrally formed from the material of the fin for deflecting fluid flowing through the tubes in the direction of the incoming fluid passing around said tubes.

3. A heat exchanger comprising a plurality of nested fin elements each having integrally formed therewith a plurality of tapered tube-forming portions, said portions being elongated in the direction of fluid flow outside the tubes, each tube-forming portion having an apertured bottom, and means associated with a plurality of the apertures in the bottom of each tube-forming portion and integrally formed from the material of the fin for deflecting fluid flowing through the tubes in the direction in which said tube forming portions are elongated.

4. A heat exchanger comprising a plurality of nested fin elements each having integrally formed therewith a plurality of tapered tube-forming portions, said portions being elongated in the direction of fluid flow outside the tubes, each tube-forming portion having a plurality of deflectors positioned therein to direct fluid diagonally through the tube and toward the incoming fluid flowing around the tube.

5. A heat exchanger comprising a plurality of nested fin elements each having integrally formed therewith a plurality of tapered tube-forming portions, said portions being elongated in the direction of fluid flow outside the tubes, each tube-forming portion having an apertured bottom wall, and certain of said tube-forming portions having a deflector formed integrally therewith for directing fluid diagonally through the tube and toward the incoming fluid flowing through the tube.

6. A heat exchanger comprising a plurality of nested fin elements having elongated tapered tube-forming portions with long sides and curved ends, tube-forming portions of one fin being nested and bonded in tube-forming portions of another fin, and stiffening ridges adjacent and merged with the long sides of said tube-forming portions, said stiffening ridges projecting on the opposite side of the fin from said tube-forming portions, and preventing distortions of said tube-forming portions while being bonded together whereby leaks adjacent said long sides of said tube-forming portions are prevented.

JOHN KARMAZIN.